United States Patent [19]
Webster

[11] 4,331,030
[45] * May 25, 1982

[54] TIRE INSPECTION AND RECORDING DEVICE

[76] Inventor: David F. Webster, 1325A Edwards Ave., Santa Rosa, Calif. 95401

[ * ] Notice: The portion of the term of this patent subsequent to Jan. 22, 1997, has been disclaimed.

[21] Appl. No.: 111,894

[22] Filed: Jan. 14, 1980

Related U.S. Application Data

[63] Continuation-in-part of Ser. No. 971,803, Dec. 21, 1978, Pat. No. 4,184,365.

[51] Int. Cl.³ .......................................... G01M 17/02
[52] U.S. Cl. .......................................................... 73/146
[58] Field of Search .......................................... 73/146

[56] References Cited

U.S. PATENT DOCUMENTS

| | | | |
|---|---|---|---|
| 2,998,983 | 9/1961 | Digate | 282/1 |
| 3,223,437 | 12/1965 | Bertsch | 282/11.5 |
| 3,878,712 | 4/1975 | Chapin | 73/146 |
| 3,933,036 | 1/1976 | Lippmann et al. | 73/146 |
| 4,184,365 | 1/1980 | Webster | 73/146 |

*Primary Examiner*—Donald O. Woodiel
*Attorney, Agent, or Firm*—Robert H. Eckhoff

[57] ABSTRACT

An inspection and recording device for ascertaining any surface abnormality on a pneumatic tire on a wheel on a dirigible vehicle and any deviation in the alignment of the wheel on which such tire is mounted with respect to the camber and toe-in of such wheel with respect to such vehicle and recording each such abnormality and each such misalignment.

2 Claims, 11 Drawing Figures

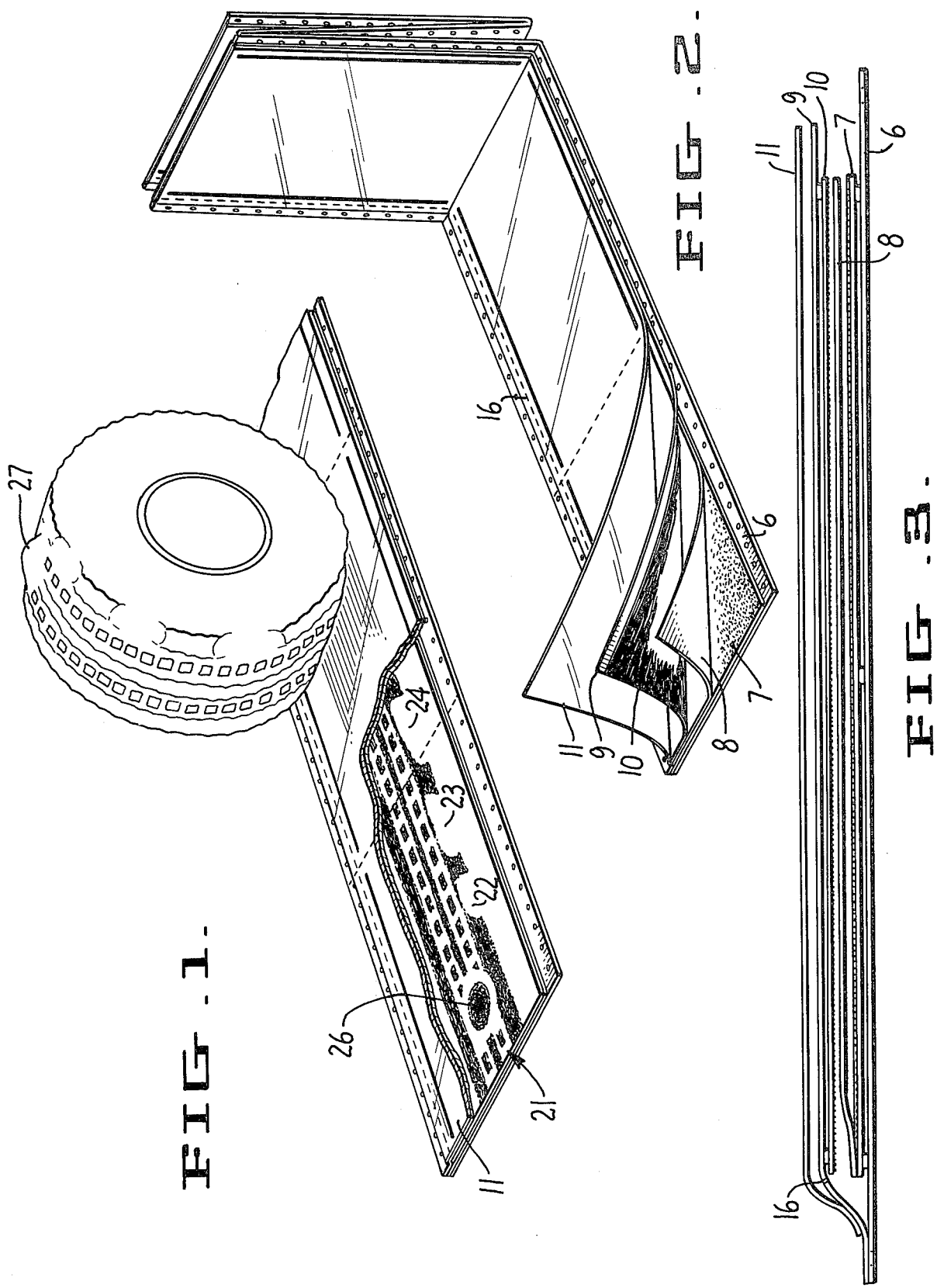

TIRE INSPECTION AND RECORDING DEVICE

This application is a continuation-in-part of my application Ser. No. 971,803, filed Dec. 21, 1978, now U.S. Pat. No. 4,184,365.

BACKGROUND OF THE INVENTION

It has long been recognized that it is necessary that the wheels on a dirigible vehicle such as an automobile be in alignment for and aft the vehicle and particularly that the front wheels have the necessary camber and toe-in.

SUMMARY OF THE INVENTION

The device of the present invention can be readily utilized by merely having the vehicle pass over the test device in one direction so that each wheel completes a partial revolution—a partial section is sufficient to provide a record of the wheel track. The device particularly provides a convenient arrangement of a cover sheet, a transfer sheet for recording the pressure applied by the wheel and the area of such pressure application which is recorded on an adhesive surface, which surface, after completion of the test, is covered by a transparent protective sheet for inspection by the person conducting the test as well as the interested owner of the vehicle.

Generally various arrangements of such sheets have been used heretofore for other purposes but without the specific arrangement contemplated and taught by this invention. In this connection, reference is made to the patents to Digate U.S. Pat. No. 2,998,983 and to Bertsch U.S. Pat. No. 3,223,437.

It is in general the broad object of the present invention to provide an improved and simple form of test device for recording the path of travel of each of the wheels of a vehicle during horizontal traverse of the vehicle over a distance sufficient to show the condition of each tire on the vehicle. The record can be that of the entire surface of the tire or, if desired, a partial segment of the tire, usually about a third.

The inspection also includes a novel method of assembly of the test device in that an adhesive coated sheet is secured to a continuous base sheet with the adhesive coating outermost. That assembly can then be incorporated with other components as is taught hereinafter.

BRIEF DESCRIPTION OF THE DRAWINGS

FIG. 1 is a perspective view showing the device of this invention in use with portions of the assembled device broken away to illustrate the construction.

FIG. 2 is a perspective view of the assembled device of this invention prior to being put to use.

FIG. 3 is an end elevation view of the device in FIG. 2.

DESCRIPTION OF THE PREFERRED EMBODIMENT

Figure 4:
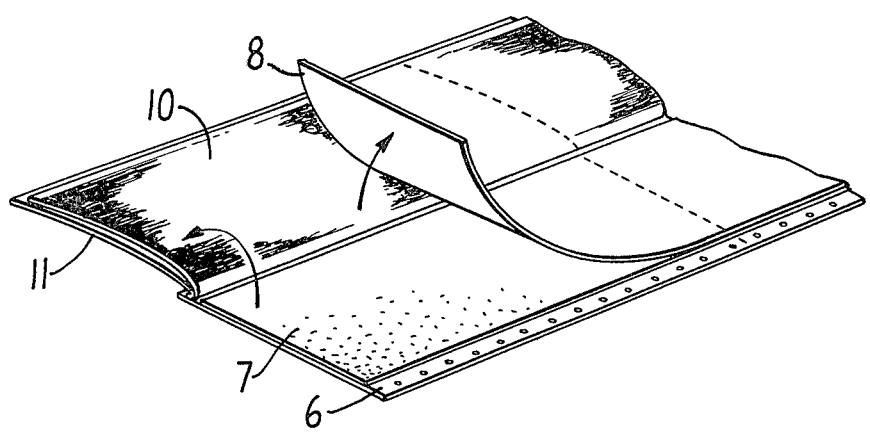
FIGS. 4-8 are views illustrating a series of manipulative steps in using the device of FIG. 2 wherein the adhesive layer is exposed in FIG. 4; recovered in FIG. 5 by the transfer sheet; a tire passes over the device in FIG. 6 to transfer its imprint onto the adhesive layer; the transfer sheet is removed in FIG. 7 and the transparent sheet is moved in FIG. 8 to cover and protect the imprinted area.

In the preferred embodiment, I provide a bottom sheet 6 having at its central area a sheet 7 coated with a suitable adhesive. The bottom sheet 6 is of a length sufficient to record the rotation of a wheel on a vehicle; usually the length is of the order of from about twenty inches to ten feet. The adhesive coated area is approximately 10 inches in width to provide an area of adequate width for recordation of the pressure application of the tread of a tire. The adhesive coated area is covered with a pressure sensitive light tack adhesive such as is provided by anyone of the many adhesive manufacture such as Cataline Plastics Suppliers, Inc. of Glendale, Ca. 91201. In the trade the adhesive coated stock is known as "coated label stock." It comprises a paper back sheet coated with the adhesive over which a wax paper is applied as a seal for the adhesive. This structure is supplied as a large roll which can be collated and applied to a lower base sheet to which the "label stock" is secured by an adhesive. This enables the structure to be assembled in roll form with no distortion in the assembled roll. The adhesive coated area is covered by a removable cover sheet 8 which is in place until just prior to the device being put to use when it is removed to expose the adhesive coated area. Superimposed over the adhesive coated area and the bottom sheet is a sheet 9 having a transfer material 10 on its underside. This can be carbon paper or an ink transfer composition such as is disclosed in the Clark U.S. Pat. No. 2,944,037.

Overlying the sheet 9 is a transparent cover sheet 11 which is hinged along one side of the bottom sheet 6 as is shown in the lefthand portion of FIG. 1. Preferably the cover sheet is of a transparent plastic such as TRI-CET. This has sufficient body so that it will not become entwined with the tread on the tire as does a paper sheet but will lay flat as in FIG. 11.

Figure 5:
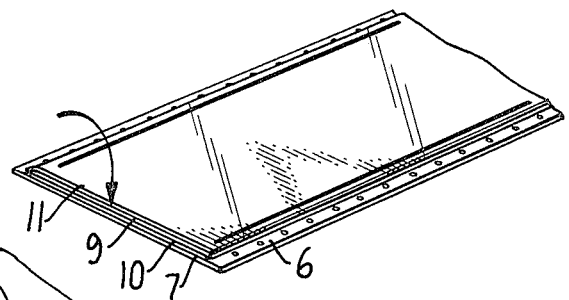
Figure 6:
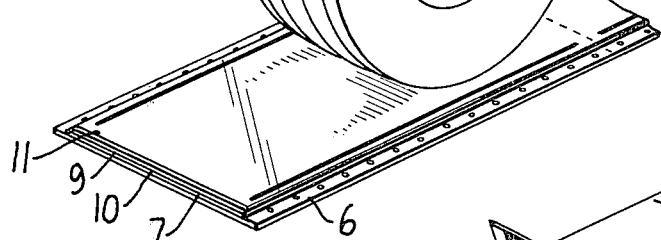
Figure 7:
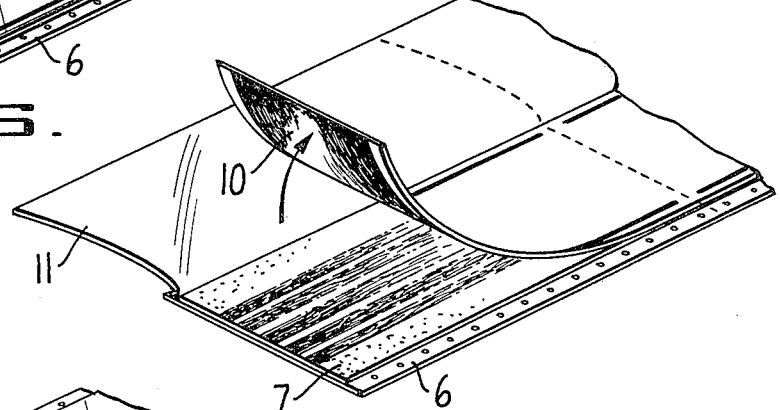
Figure 8:
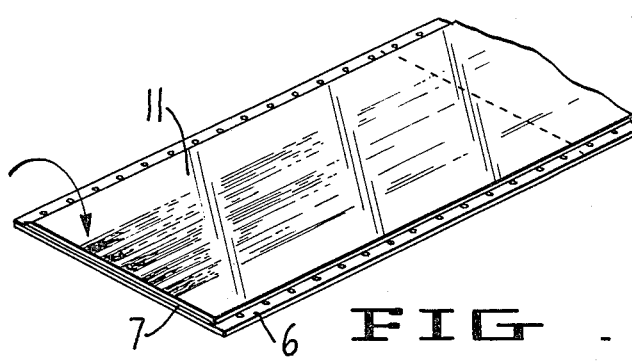

With the cover sheet 8 removed from over the adhesive covered area the structure will be as appears in FIG. 5 with the cover sheet 11 uppermost so the structure is ready to receive the impression from the tire as shown in FIG. 6. Upon completion of the reception of the tire impression, the cover sheet 11 is then moved to one side as in FIG. 7 and sheet 9 carry the transfer material 10 is then removed as in FIG. 7. Upon return of the cover sheet 11 over the adhesive coated area upon which the impression has been made as in FIG. 8, the assembled structure is then ready for inspection.

Figure 9:
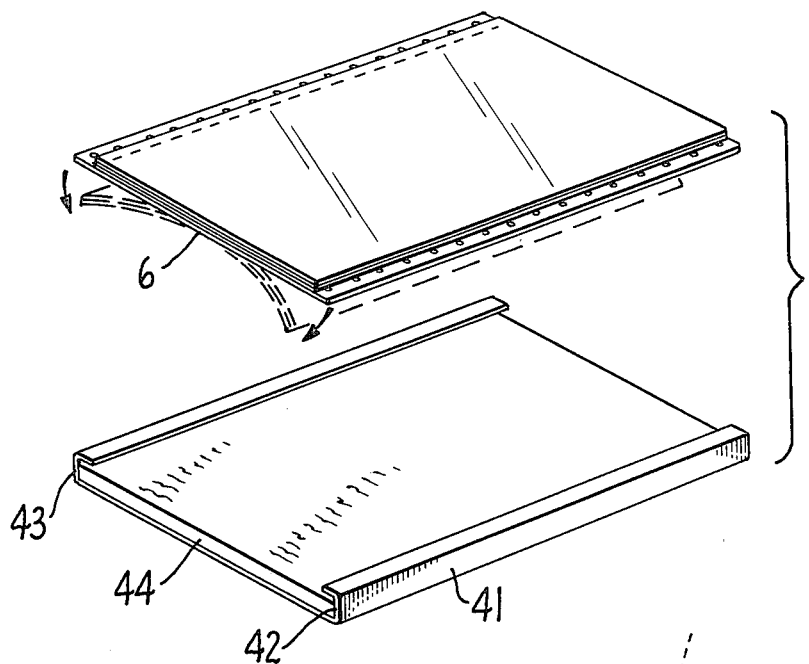
FIG. 9 is a perspective view showing a means for utilizing the device to record the condition of a tire.
Figure 10:
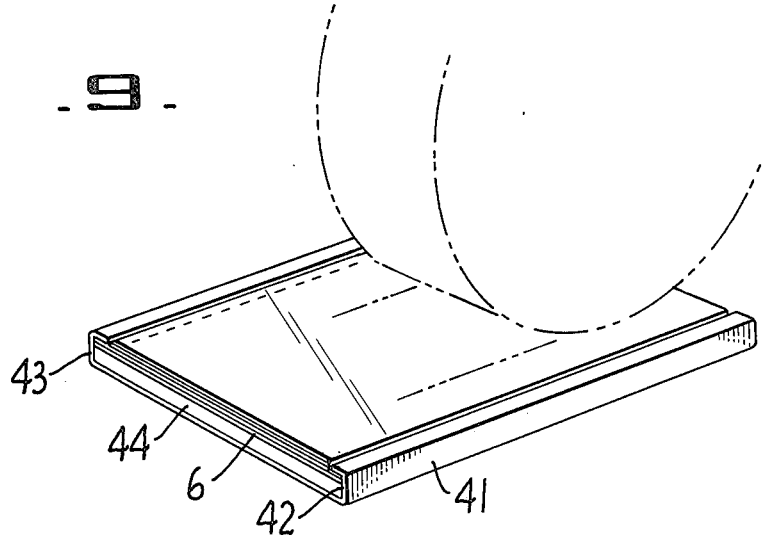
FIG. 10 shows the device of FIG. 9 in use recording the condition of a tire.
Figure 11:
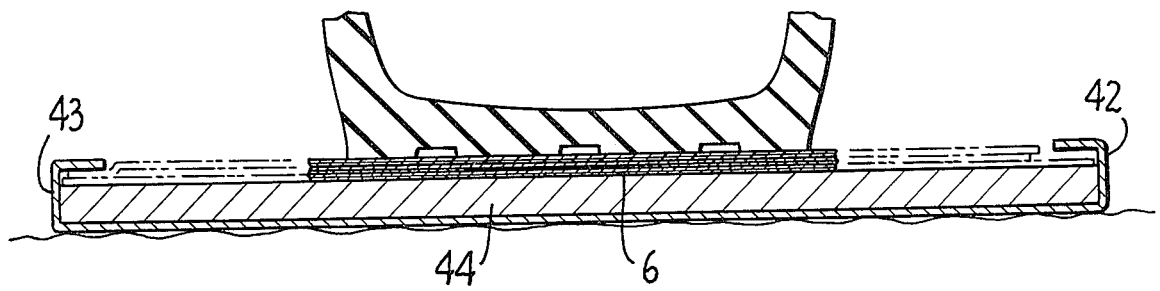
FIG. 11 is a section taken transversely of the assembled recording device.

In use it is preferable to utilize a tray structure 41 shown in FIGS. 9, 10 and 11 to hold the structure during the application. This comprises a tray of width to receive the device and having flanged edges 42 and 43. The base of the tray 42 is covered with a flexible covering 44 so that if the tire happens to have rocks or other foreign objects embedded in it these will not affect the plastic sheet adversely. The tray is ordinarily used when the examination of a tire is made on a rough surface. Preferably the inspection is made with the device supported as upon the surface of a concrete floor, but when one is not available the device of FIGS. 9-11 can be utilized.

I claim:

1. An inspection and recording device for ascertaining any surface abnormality on a pneumatic tire on a wheel on a dirigible vehicle and any deviation in the alignment of the wheel on which such tire is mounted with respect to the camber and toe-in of such wheel with respect to such vehicle and recording each such abnormality and each such misalignment comprising, a base sheet, a second sheet attached to the base sheet having an adhesive coated area on a central portion of the sheet and between the longitudinal edges of the base sheet, a first cover sheet removably attached to the base sheet and extensions over the adhesive coated area, a second cover sheet removably attached along one longitudinal side edge of the base sheet, an ink transfer sheet secured to the underside of the second cover sheet, and an outer transparent sheet secured along said one longitudinal edge.

2. An inspection and recording device for ascertaining any surface abnormality on a pneumatic tire on a wheel on a dirigible vehicle and any deviation in the alignment of the wheel on which such tire is mounted with respect to the camber and toe-in of such wheel with respect to such vehicle and recording each such abnormality and each such misalignment comprising an upper sheet having a central area thereon defining a test area, marginal areas on either side of said test area, intermediate ink transfer means disposed beneath the test area on the upper sheet, a second sheet having an adhesive coated area thereon positioned below the upper sheet with the adhesive coated area only in the area of said second sheet located beneath said test area, the areas on said second sheet disposed beneath said upper sheet marginal areas being free of adhesive, said adhesive permanently receiving impressions imparted by any pressure applied in the test area on the upper sheet and transferred from the intermediate ink transfer surface, said areas on said second sheet which are free of adhesive not forming any impression of any portion of pressure applied to said upper sheet marginal areas so that only that portion of pressure application which is applied to said test area is recorded on said second sheet to form thereby a permanent record of pressure application during a pressure test, and a removable protective sheet over said adhesive coated area which is removed from between the upper sheet and the second sheet during application of any pressure to the test area.

* * * * *